United States Patent
Wayman et al.

(10) Patent No.: US 9,640,077 B2
(45) Date of Patent: May 2, 2017

(54) SYSTEM AND METHOD FOR DETERMINING POSITION OF A POSITION DEVICE RELATIVE TO A MOVING VEHICLE

(71) Applicant: BackSafe Systems, Eden Prairie, MN (US)

(72) Inventors: Michael J. Wayman, Waconia, MN (US); Kevin J. Thompson, Chaska, MN (US); Kirk R. Johnson, Rogers, MN (US); Michael John Brusseau, Center City, MN (US)

(73) Assignee: BACKSAFE SYSTEMS, INC., Eden Prairie, MN (US)

( * ) Notice: Subject to any disclaimer, the term of this patent is extended or adjusted under 35 U.S.C. 154(b) by 0 days.

(21) Appl. No.: 14/843,151

(22) Filed: Sep. 2, 2015

(65) Prior Publication Data
US 2016/0068157 A1   Mar. 10, 2016

Related U.S. Application Data

(60) Provisional application No. 62/045,714, filed on Sep. 4, 2014.

(51) Int. Cl.
| | |
|---|---|
| G08G 1/16 | (2006.01) |
| B60W 30/00 | (2006.01) |
| B62D 15/02 | (2006.01) |
| G07C 5/00 | (2006.01) |
| B60Q 1/22 | (2006.01) |

(52) U.S. Cl.
CPC ............. *G08G 1/168* (2013.01); *B60W 30/00* (2013.01); *B62D 15/027* (2013.01); *G07C 5/008* (2013.01); *B60Q 1/22* (2013.01)

(58) Field of Classification Search
CPC ........ B60Q 1/22; G08G 1/0962; G08G 1/161; G08G 1/163; G08G 1/168; G08G 5/065; G08C 2201/91; B62D 15/027; B62D 15/028; G07C 5/008
See application file for complete search history.

(56) References Cited

U.S. PATENT DOCUMENTS

| | | | |
|---|---|---|---|
| 4,207,958 A * | 6/1980 | Viall, Sr. | B60R 19/56 180/271 |
| 4,664,218 A * | 5/1987 | Graham | B60T 7/122 180/272 |
| 7,100,052 B2 | 8/2006 | Ghazarian | |
| 7,362,229 B2 | 4/2008 | Brinton et al. | |
| 7,486,181 B2 | 2/2009 | Olsen et al. | |
| 7,567,167 B2 | 7/2009 | Oelrich et al. | |
| 7,777,617 B2 | 8/2010 | Oelrich et al. | |
| 8,013,720 B2 | 9/2011 | Oelrich et al. | |
| 8,031,086 B2 | 10/2011 | Thacher et al. | |
| 8,120,467 B2 | 2/2012 | Ehrman et al. | |
| 8,230,362 B2 | 7/2012 | Couch | |

(Continued)

FOREIGN PATENT DOCUMENTS

FR     2493567 A1 *  5/1982

*Primary Examiner* — Behrang Badii
*Assistant Examiner* — David Testardi
(74) *Attorney, Agent, or Firm* — Kagan Binder, PLLC

(57) ABSTRACT

There is disclosed a vehicle backing system configurable by a driver or spotter as a function of the type of the vehicle being backed up and a spotter's position and/or a position of another vehicle located at a rear of a first vehicle.

3 Claims, 3 Drawing Sheets

Wand Deployed but Not Properly Position to Eliminate Blind Spot

(56) References Cited

U.S. PATENT DOCUMENTS

| | | |
|---|---|---|
| 8,350,696 B2 | 1/2013 | McClellan et al. |
| 8,427,340 B2 | 4/2013 | Palmieri |
| 8,630,768 B2 | 1/2014 | McClellan et al. |
| 8,710,970 B2 | 4/2014 | Oelrich et al. |
| 8,905,855 B2 | 12/2014 | Fitzpatrick et al. |
| 8,972,097 B2 | 3/2015 | McQuade et al. |
| 8,972,179 B2 | 3/2015 | Brinton et al. |
| 2003/0102974 A1* | 6/2003 | Allen .................. G08G 1/20 340/686.6 |
| 2004/0236474 A1* | 11/2004 | Chowdhary ....... G06Q 30/0601 701/1 |
| 2005/0046562 A1* | 3/2005 | Stigall .................. A41D 13/00 340/463 |
| 2007/0250232 A1 | 10/2007 | Courney, Jr. et al. |
| 2010/0201573 A1 | 8/2010 | Lamming |
| 2011/0133951 A1* | 6/2011 | Palmieri .............. G08G 1/161 340/901 |
| 2011/0285535 A1 | 11/2011 | Barwin |
| 2012/0253548 A1* | 10/2012 | Davidson ............. G06Q 10/08 701/1 |
| 2013/0188050 A1* | 7/2013 | Winget ................ G08G 1/168 348/148 |
| 2013/0300580 A1 | 11/2013 | Palmieri |
| 2013/0332004 A1* | 12/2013 | Gompert ............. G07C 5/0866 701/1 |
| 2014/0167921 A1 | 6/2014 | Sawyer |
| 2014/0167946 A1* | 6/2014 | Armitage ........... G07C 5/0816 340/439 |
| 2014/0303849 A1* | 10/2014 | Hafner ................. B62D 13/06 701/42 |
| 2015/0002314 A1* | 1/2015 | Warner ................ G08G 1/168 340/932.2 |
| 2015/0022377 A1 | 1/2015 | Oelrich et al. |
| 2015/0081161 A1 | 3/2015 | Chapman et al. |
| 2015/0175161 A1 | 6/2015 | Breed |

* cited by examiner

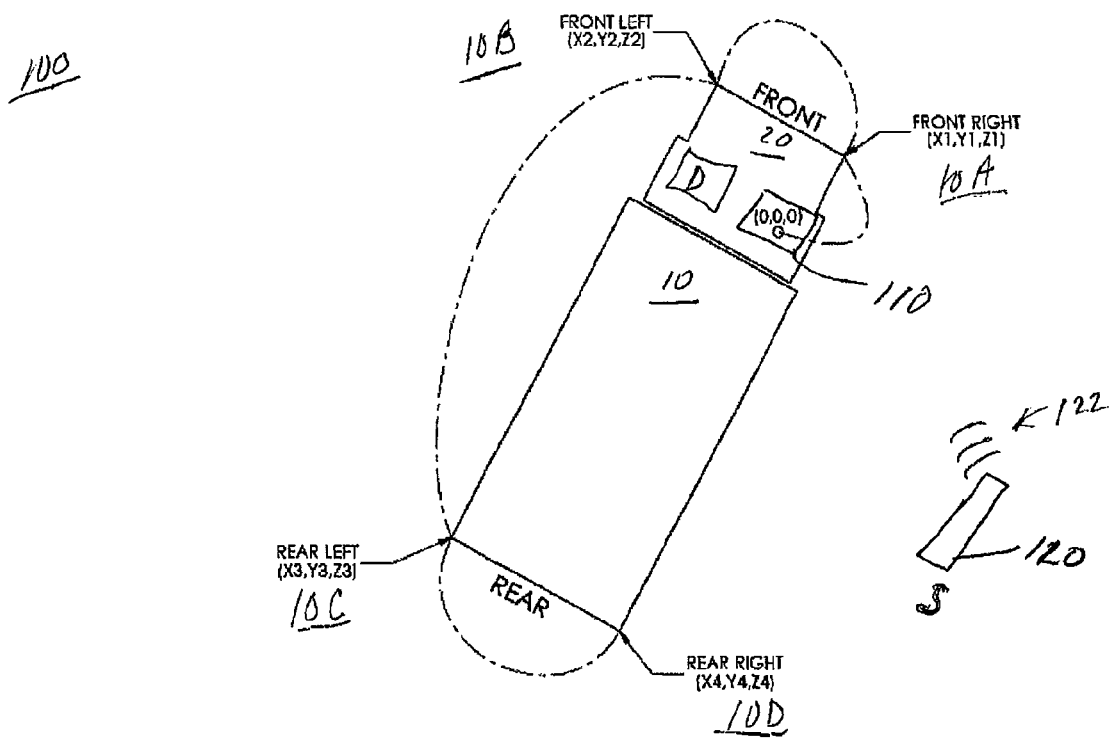
Figure 1 - Programming the Device to the Geometry of the Vehicle

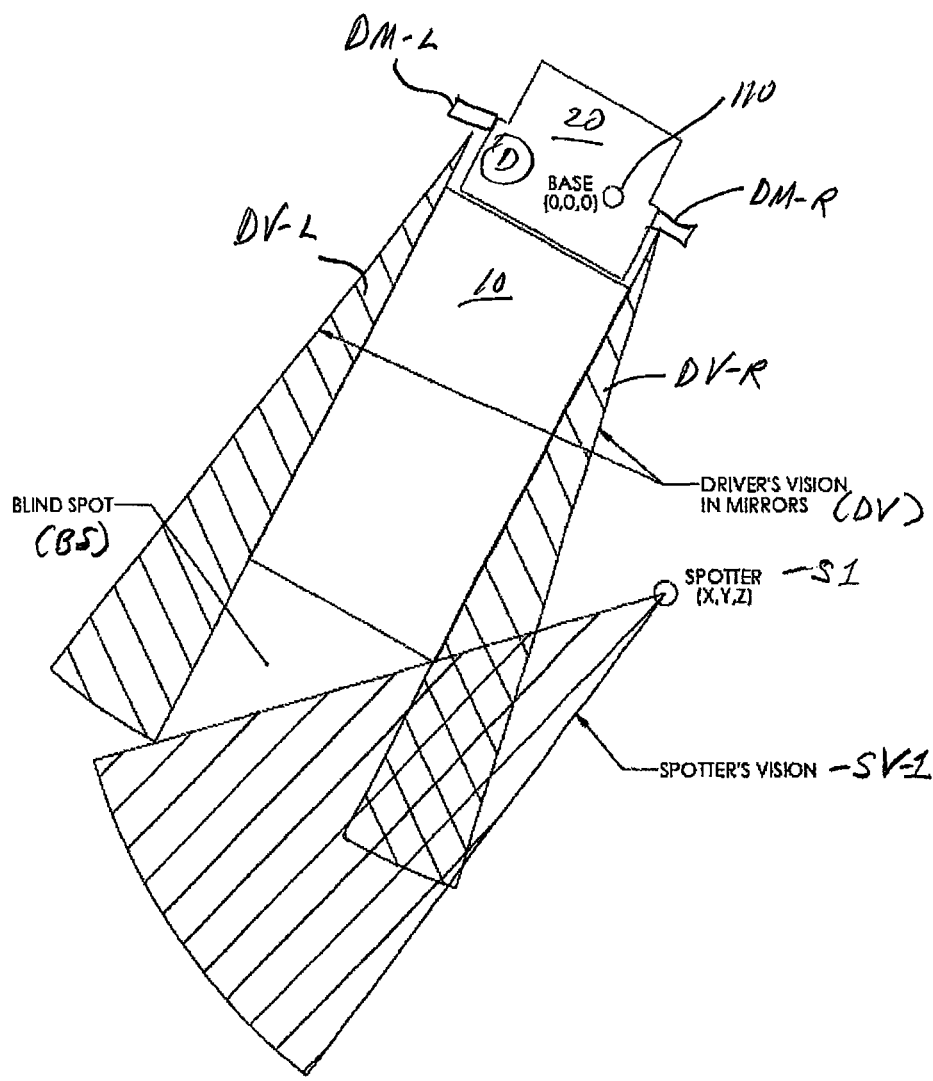
Figure 2 - Wand Deployed but Not Properly Position to Eliminate Blind Spot

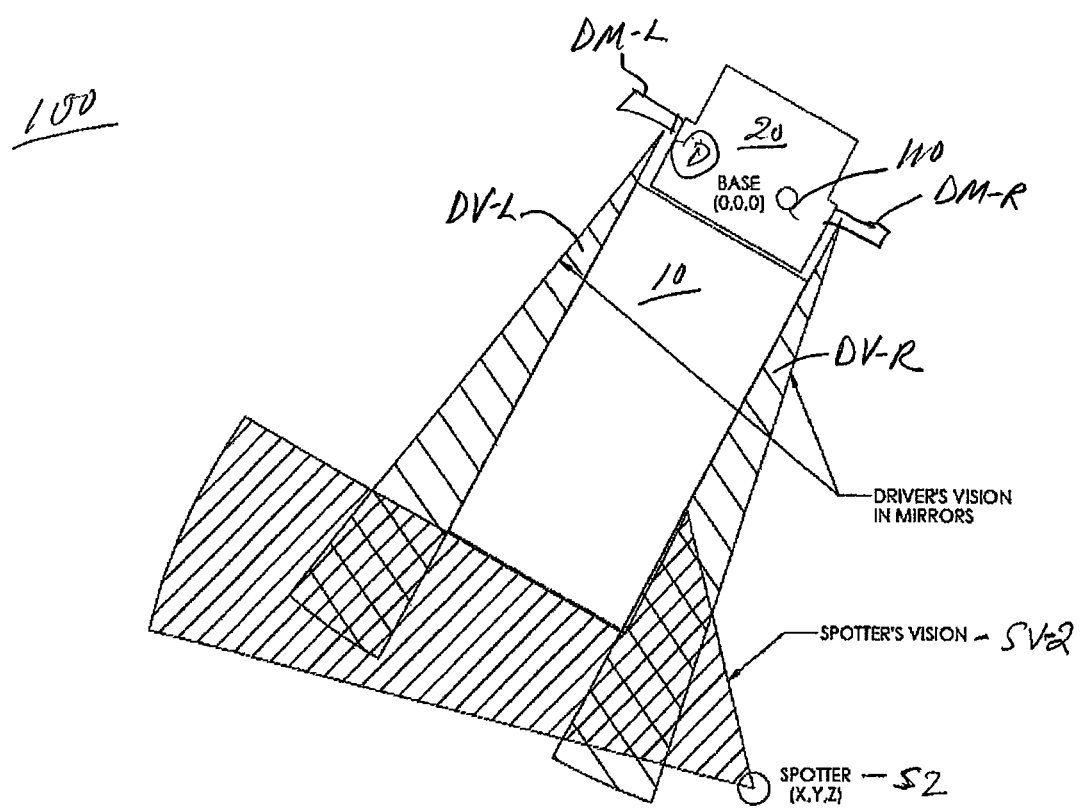
Figure 3 - Spotter Positioned Appropriately to Eliminate Blind Spots

SYSTEM AND METHOD FOR DETERMINING POSITION OF A POSITION DEVICE RELATIVE TO A MOVING VEHICLE

CLAIM OF PRIORITY

This nonprovisional patent application claims the benefit of and priority, under 35 USC §119(e), to U.S. Provisional Patent Application No. 62/045,714, filed on Sep. 4, 2014, entitled "SYSTEM AND METHOD FOR DETERMINING POSITION OF A POSITION DEVICE RELATIVE TO A MOVING VEHICLE," the entirety of which is incorporated herein by reference.

FIELD AND BACKGROUND OF THE INVENTION

The invention relates generally to apparatus and/or methods for improving safety for personnel working with drivers during vehicle maneuvers.

Large motor vehicles serve many functions in modern society. For example, emergency crews may operate fire trucks, ambulances, and other rescue vehicles to and from locations where they are needed to perform various emergency response functions. Professional drivers operate semi-trailer trucks or a delivery van in a fleet, for example, to deliver goods or services to their destinations. As a further example, non-commercial large vehicles, such as mobile homes or other recreational vehicles, may be driven between residential and remote locations. As further examples, garbage and recycling pick-up trucks operate in residential areas, and construction vehicles, such as dump trucks or cement trucks, operate in or around road or building construction sites.

However, every year, tragic deaths, serious injuries and substantial property damage occur when backing many of types of vehicles. In addition, these incidents may permanently or temporarily take these vehicles of out of service until a formal inspection is performed, due to insurance regulations and city ordinances, even if the damage is minimal or does not affect the integrity of the emergency vehicle. This then leaves the fleet or emergency service department short-handed in terms of available equipment. While the reverse or backing-up speeds involved may be much lower than forward operation, driver visibility and depth perception may be significantly affected and obscured by the physical size and viewing angles available to the driver, particularly when the driver is located at a substantial distance from the back of the vehicle.

In many situations, large motor vehicles, such as fire trucks, that make backing maneuvers at certain locations, such as at a fire station, may back into a parking position between other vehicles and/or fire station structures, such as a garage door pillar. At an emergency site, emergency vehicles may need to perform backing maneuvers to access a fire hydrant. This also applies to other situations other than emergency vehicles.

While backing the large vehicle, the large vehicle operator may have little or no visibility in some or all of the immediate zones in the path of the backing vehicle. The size and features of the vehicle may substantially obscure the driver's view of people or objects in the vehicle's path. In some circumstances, visibility may be further limited by unfavorable lighting conditions and/or unfamiliar terrain. Ambient and/or vehicle noise, for example, may further complicate the driver's ability to detect dangerous conditions that may develop behind the backing vehicle. In some cases, radio links may not provide sufficient access to rapidly communicate safety information to a driver. For example, crowded radio channels may cut-off the ability of a spotter to "break-in" to a channel to notify a driver of a hazard when a hazard is detected.

Various published accounts suggest that backing of large vehicles can pose significant risks to both personnel and property. For example, citizens and/or fire crew personnel may be present in or near the path of a backing emergency vehicle. Therefore there is a need in the market to provide devices for improving safety for personnel involved in moving large vehicles with known or potential blind spots.

SUMMARY OF THE INVENTION

In certain vehicle backing situations, even though a spotter may hold a handheld device for communication with a driver of vehicle backing up, there may still be a need to know the position or location of the handheld or portable accessory to a vehicle back-up system relative to the currently moving vehicle. Since GPS signals are not always available or preferred as a method of determining position in these situations, in one example embodiment of the invention, there is provided a method of using dead reckoning modules and a known geometry of the main vehicle to be moved to track and record the movement of both the vehicle and a secondary device (in this example, the spotter's handheld device).

In a related embodiment, a first vehicle may need to track a second vehicle that is close proximity instead of the spotter's wand (such as the module within the cab of the second vehicle).

BRIEF DESCRIPTION OF THE DRAWINGS

Other important advantages of various embodiments of the invention will be apparent from the following detailed description of the invention taken in connection with the accompanying drawings, in which:

FIG. 1 illustrates an example of a vehicle coordinate system forming part of a vehicle backing system in accordance with the invention;

FIG. 2 illustrates areas of visibility of a large vehicle driver and a spotter and a potential blind spot for a vehicle intending to back up; and FIG. 3 illustrates an example embodiment of an improved vehicle backing system and method in accordance with the invention.

DETAILED DESCRIPTION OF THE INVENTION

Following below are more detailed descriptions of various embodiments of an improved vehicle backing and compliance system described herein. In particular, the various embodiments disclosed herein describe a vehicle backing system configurable by a driver or spotter as a function of the type of the vehicle being backed up and a spotter's position and/or a position of another vehicle located at a rear of a first vehicle. It should be appreciated that various aspects of the subject matter introduced above and discussed in greater detail below may be implemented in any of numerous ways, as the subject matter is not limited to any particular manner of implementation. Examples of specific implementations and applications are provided primarily for illustrative purposes.

As discussed above, the most common and most widely used method for ensuring safe vehicle backing is to have a spotter stand behind the vehicle and watch for hazards and communicate with the driver. Often however, the crew (driver and spotter) does not follow company procedure or protocol and the spotter is not accustomed to used or is not properly positioned to protect the backing maneuver (especially where there is blind spot for both the driver and the spotter). It would be advantageous for the spotter to have a handheld device that would track the spotter's position along with that of the backing vehicle. By tracking and recording these positions, the vehicle crew would know that their actions were being monitored and therefore would be more likely to comply with the proper backing procedure and use of the equipment provided for same.

Additionally, if an incident were to occur, having evidence of the position of the spotter and of the vehicle would be advantageous in accident investigations, insurance claims and potential personal injury or property damage claims or litigation. GPS or other external positioning references cannot always be counted on to be present in every situation, so this method of coordinating and overlaying the dead reckoning data of the vehicle with the dead reckoning data of the device carried by the spotter would be operable in virtually any and all conditions and situations.

Referring now to the Figures, FIG. 1 illustrates an example of a vehicle coordinate system 100 forming part of a vehicle backing system in accordance with the invention. In particular, FIG. 1 illustrates a method of programming a cab module (or base unit) 110 and a handheld device 120 for vehicle back up system 100 as a function of a geometry of a vehicle 10 having a cab 20 with a driver D that is about to be backed up or go in reverse. In this example embodiment, handheld device or wand 120 held by a spotter S communicates wirelessly 122 with module 110 that is configured to be mounted in cab 20 and is charged in the base unit or module until it is needed. Note that an outer perimeter or geometry of the vehicle is identified by its four coordinates as front right 10A (X1,Y1,Z1); front left 10B (X2,Y2,Z2); rear left 10C (X3,Y3,Z3); and rear right 100 (X4,Y4,Z4).

When the base unit is installed, the base unit is mounted and the wand is removed from the base unit and set to a programming mode. By touching the wand to each of the four corners of the vehicle and pressing a trigger on the wand or handheld device 120 at each position or corner, the wand and base unit learn the locations of the four corners of the vehicle in relation to the base unit as shown in FIG. 1. X, Y and Z coordinates are recorded at each position and the base unit uses those to associate or correlate the position and orientation of the truck as the backing operation occurs.

In this example embodiment, the corners of the truck are located by the cab unit charger having a dock for the wand and is permanently mounted to the vehicle cab. The user is instructed to remove the wand from the charger, take it to the corner of the truck, touch the corner, and then depress the trigger on the wand. This trigger or actuation records the dead-reckoning position of the wand in relation to the charger and therefore records the X,Y position of the corner of the vehicle. The user then repeats the steps for the other three corners of the vehicle. This creates four unique X,Y positions along with 0,0 position of the charger. In a related embodiment, the backing system uses GPS to provide feedback on the coordinates or uses RF tags or modules placed on each corner of the vehicle that communicate with the wand.

FIG. 2 illustrates areas of visibility of a large vehicle driver and a spotter and a potential blind spot for a vehicle intending to back up. In this example embodiment, vehicle 10 has a set of driver side mirrors DM-R and DM-L that provide the driver with a field of vision on the right side of the vehicle DV-R and a field of vision on the left side of the vehicle DV-L. When the vehicle is backing up or in reverse, it is required by most safety procedures that the spotter removed the wand from the base unit and positions himself in an area where he can safely see all areas behind the truck and use the wand to communicate with the cab if the driver needs to stop.

Note that in this example, the spotter S that holds the wand has a spotter's field of vision of SV-1 but is unable to see the blindspot BS area behind the vehicle. Although the wand is deployed, the spotter nor the wand is properly positioned to eliminate a Blind Spot (BS). Although the base unit is connected to the reverse circuit of the truck, in this example embodiment, if the vehicle is shifted into reverse and the wand is not removed from the base unit, system 100 records the event as non-compliance with proper procedure. This non-compliance is reported to the vehicle crew supervisor and/or is electronically captured in a database for later reference.

In this example embodiment, if the vehicle is shifted into reverse and the crew attempts to circumvent system 100 by removing the wand but not leaving the cab, the base unit would record the X,Y,Z coordinates of the wand and determine that it never went beyond the bounds of the vehicle as defined during the initial programming. This non-compliance would also be recorded and/or reported to the crew supervisor.

Further to this example embodiment, if the vehicle is shifted into reverse and the wand is deployed, the position of the wand is tracked continuously while the base unit is also recording the position of the vehicle. If at any time during the backing or the vehicle is in reverse it is determined the spotter is not in a proper position to safely view the entire rear of the vehicle, as shown in FIG. 2, that information is recorded and used for training by the crew supervisor to ensure the crew understands how to position themselves to protect the backing maneuver in the future.

FIG. 3 illustrates an example embodiment of an improved vehicle backing system 100 and method in accordance with the invention. FIG. 3 illustrates how a spotter is positioned appropriately to eliminate blind spots. If the vehicle shifts into reverse and the spotter is deployed with the wand and positions themselves in a safe manner as shown in FIG. 3, such information would also be recorded. Should an accident occur while the vehicle is in reverse, the vehicle crew and owner could show the proper procedure was followed and the crew was acting reasonably and safely during the vehicle backing operation.

In a related embodiment, the vehicle backing system includes memory storage (audio, video and data or any combination thereof) capabilities to provide the user with the ability to record the position of the spotter and vehicle for logging or data tracking and provides real-time feedback if the spotter is not in the proper position to properly guard or control the driver's vehicle backing operation. Hence, if the spotter's S blind spot situation were to arise as described in FIG. 2, cab unit 110 would indicate (and alert the driver D) that the driver D should stop and the spotter's wand would also generate an alarm (e.g., light and/or sound and/or vibrate) to let spotter S and driver D know they are not positioned properly (thus creating a blind spot). In a related embodiment, the system provides the capability of recording and playing back after the vehicle backing event along with alerting the driver in real time if the spotter's position created or is creating a blind spot.

Referring again to FIGS. 1 and 3, in a related embodiment, system 100 is configured such that it is able to transmit and receive data automatically to and from vehicle 10 equipped with a mobile transceiver unit (MTU), integrated with or communicatively coupled with cab unit 110, as it drives near a fixed transceiver unit (FTU). In this example embodiment, a set of vehicle backing data collected by cab unit 110 (coupled to the MT unit) would be transferred and stored for analytical use. In this example embodiment, system 100 consists of a fixed wireless transceiver unit (FTU) mounted in a place, such as a garage, entry gate, etc. . , which automatically polls or collects data when a truck or vehicle cab 20 equipped with the mobile wireless transceiver passes or is within range of the FTU. Any data vehicle 10 collected while out of range would be transmitted from the MTU to the FTU whenever the MTU comes within range of the FTU. The FTU, in this example embodiment, would either contain a computer or microprocessor with a memory storage unit and wireless capability to assimilate the MTU data or be connected to a local or cloud based data storage. Other forms of data, such as software updates or calibration data, could be transmitted from the FTU to the MTU in a similar manner. Data would be transmitted to the FTU through an internet connection or manual installation and it would transmit that data to the MTU whenever the MTU came within range. These processes would allow data to be transferred without human intervention or are configurable to having prompting and approval events to control data transfers. Additionally, more than one FTU could supply data to the same central data collection (CDC) site. Once the raw data has been automatically transferred from the MTU, through the FTU and into the data collection site, the raw data can be manipulated through algorithms into summary data that can be viewed and interpreted by safety personnel, finance, logistics/supply chain or auditor.

An advantage of this method of communication and data transfer is that large amounts of collected raw data are quickly and automatically transferred to a collection site. If the data collection site is not local to the FTU, multiple FTUs can upload their data to a central location. Once the data is at the central collection site, the microprocessor of the system along with the memory storage (either on hard drives/servers or on the Cloud) is capable of: comparing past and present activity data from the same vehicle; extracting trends from the data sets in a single vehicle over time; and conducting regression analysis of past data sets to help identify if new data sets are outliers. All data sets from a single FTU could be compared to data sets from other FTUs to determine if there is a location dependent variation. End users of the data could see summarized data rather than sort through large amounts of raw data.

In a related embodiment, the data is used to monitor the behavior of the vehicle crew, the monitoring data would be secure and could not be tampered with by the crew but would be automatically uploaded for a supervisor to review. Automatic alerts could be issued to a supervisor if the data indicated the crew of a vehicle equipped with an MTU was violating an equipment safety policy or procedure. Each time the vehicle equipped with the MTU came within range of the FTU, the raw data would be uploaded reducing the likelihood of losing the data in the event of vehicle damage or theft. By automatically uploading the data without human intervention or possible tampering, the integrity of the data is held to a higher level making it more reliable in investigations or for purposes of lowering insurance premiums due to demonstrable safety data.

The following patents and publications are herein incorporated by reference in their entireties: U.S. Pat. Nos. 7,567,167; 7,777,617; 8,013,720; 8,710,970; 8,427,340; 8,350,696; 8,630,768; 2013/0332004 and U.S. Publication 2013/0300580.

While the invention has been described above in terms of specific embodiments, it is to be understood that the invention is not limited to these disclosed embodiments. Upon reading the teachings of this disclosure many modifications and other embodiments of the invention will come to mind of those skilled in the art to which this invention pertains, and which are intended to be and are covered by both this disclosure and the appended claims. It is indeed intended that the scope of the invention should be determined by proper interpretation and construction of the appended claims and their legal equivalents, as understood by those of skill in the art relying upon the disclosure in this specification and the attached drawings.

What is claimed is:

1. A vehicle backing system comprising:
   a base unit adapted to be installed in a vehicle;
   a wand adapted to be carried by a spotter and configured to be docked to the base unit;
   wherein the system includes means for determining a position of the wand relative to the base unit, and
   wherein the base unit includes:
   a) means for learning positions of rear corners of the vehicle;
   b) means for determining from the position of the wand and the positions of the rear corners of the vehicle whether the spotter carrying the wand is in a proper position to eliminate a blind spot at a rear of the vehicle; and
   c) means for recording information regarding whether or not the spotter is in the proper position to eliminate the blind spot when the vehicle is shifted into reverse.

2. The vehicle backing system as recited in claim 1, wherein the base unit is configured to instruct a user to touch the rear corners of the vehicle with the wand so that the positions of the rear corners of the vehicle are learned by the base unit.

3. The vehicle backing system as recited in claim 1, wherein the base unit further includes means for wirelessly transmitting the recorded information for analytical use.

* * * * *